(12) United States Patent
Itano et al.

(10) Patent No.: US 10,794,237 B2
(45) Date of Patent: Oct. 6, 2020

(54) CONTROL DEVICE FOR INTERNAL COMBUSTION ENGINE

(71) Applicant: MITSUBISHI JIDOSHA KOGYO KABUSHIKI KAISHA, Tokyo (JP)

(72) Inventors: Ryosuke Itano, Tokyo (JP); Toshiyuki Miyata, Tokyo (JP); Hitoshi Toda, Tokyo (JP); Tsuyoshi Tadanaga, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/363,479

(22) Filed: Mar. 25, 2019

(65) Prior Publication Data

US 2019/0292950 A1 Sep. 26, 2019

(30) Foreign Application Priority Data

Mar. 26, 2018 (JP) .................................. 2018-058924

(51) Int. Cl.
*F02D 13/02* (2006.01)
*F01L 1/34* (2006.01)
(Continued)

(52) U.S. Cl.
CPC ............ *F01L 1/34* (2013.01); *F02D 13/0215* (2013.01); *F02D 13/0261* (2013.01);
(Continued)

(58) Field of Classification Search
CPC ..... F01L 1/34; F01L 2201/00; F02D 13/0215; F02D 13/0261; F02D 13/0249;
(Continued)

(56) References Cited

U.S. PATENT DOCUMENTS 6,101,998 A * 8/2000 Tamura ............... F02D 41/3029
123/295
6,295,970 B1 10/2001 Kawakami
2009/0164099 A1 6/2009 Suzuki et al.

FOREIGN PATENT DOCUMENTS

JP 2749226 B 2/1998
JP 2017-53244 A 3/2017

OTHER PUBLICATIONS

Extended European Search Report dated Aug. 19, 2019 in corresponding European Patent Application No. 19164635.5.

* cited by examiner

*Primary Examiner* — Hai H Huynh
(74) *Attorney, Agent, or Firm* — Birch Stewart Kolasch & Birch LLP

(57) ABSTRACT

A control device has a VVT (variable valve timing) mechanism which changes opening or closing timing of at least one of an intake valve and an exhaust valve, and includes: a processor; a sensor for detecting atmospheric pressure; and a sensor for detecting the amount of air flowing through an intake air flow path. The processor calculates a charging efficiency based on the detected amount of air, calculates a volumetric efficiency from the detected amount of air and the detected atmospheric pressure, calculates the charging efficiency valve opening timing of the intake valve based on the charging efficiency, calculates the volumetric efficiency valve opening timing of the intake valve based on the volumetric efficiency, and sets the valve opening timing(s) of at least one of the intake valve and the exhaust valve based on one of the charging efficiency valve opening timing and the volumetric efficiency valve opening timing.

3 Claims, 4 Drawing Sheets

(51) Int. Cl.
*F02D 41/00* (2006.01)
*F02D 41/18* (2006.01)

(52) U.S. Cl.
CPC ...... *F02D 41/0002* (2013.01); *F01L 2201/00* (2013.01); *F02D 41/18* (2013.01); *F02D 2041/001* (2013.01); *F02D 2200/0411* (2013.01); *F02D 2200/703* (2013.01)

(58) Field of Classification Search
CPC ............ F02D 13/0234; F02D 41/0002; F02D 41/0007; F02D 41/18; F02D 2041/001; F02D 2200/0411; F02D 2200/703
USPC ....... 123/90.15; 701/103; 73/114.32, 114.33, 73/114.37
See application file for complete search history.

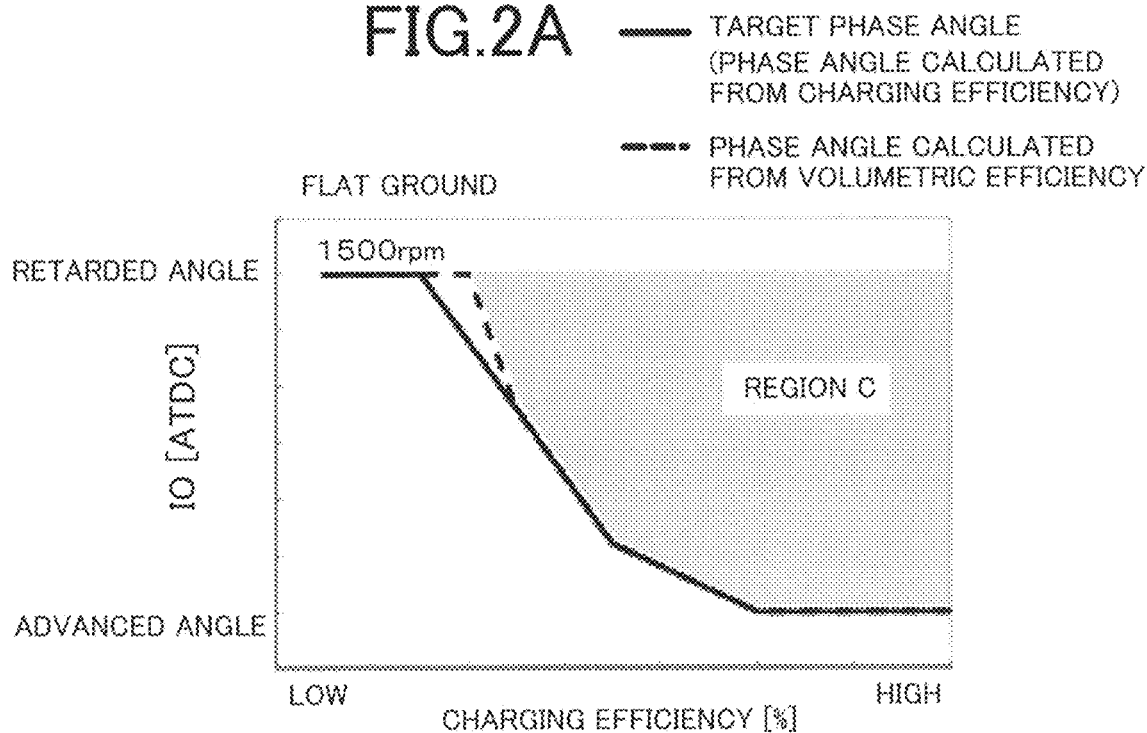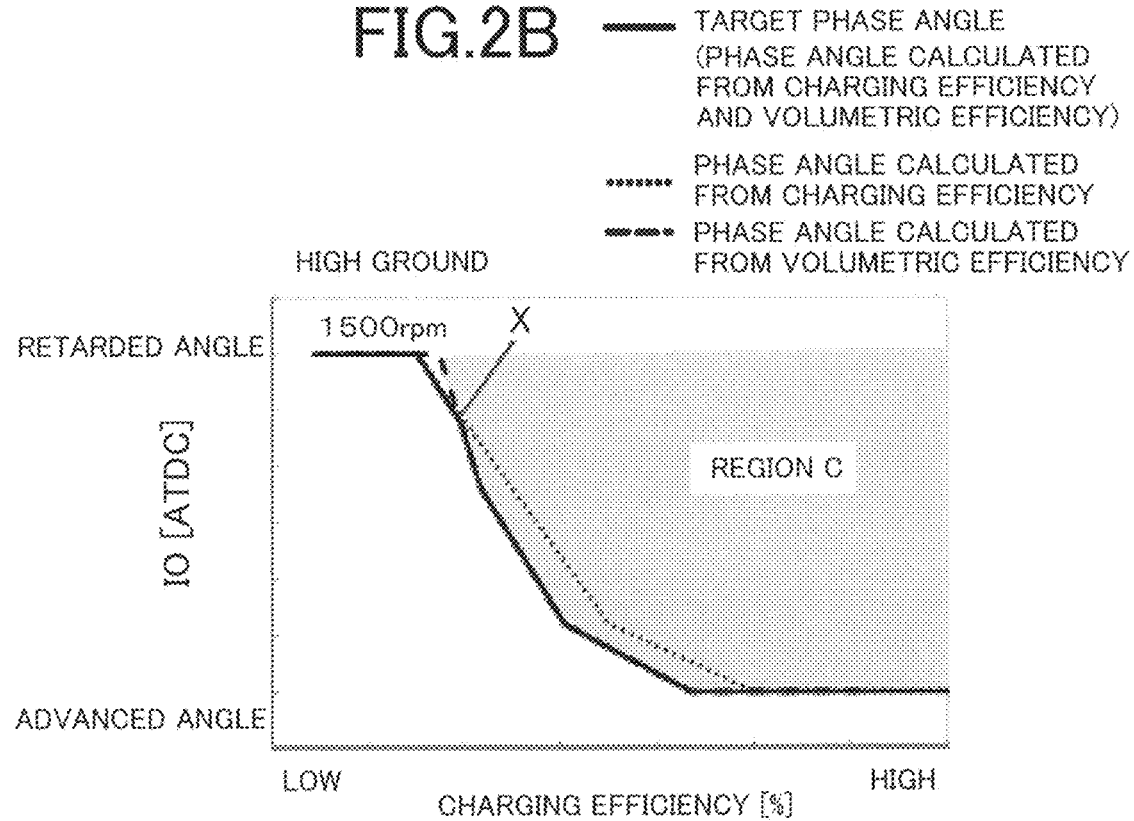

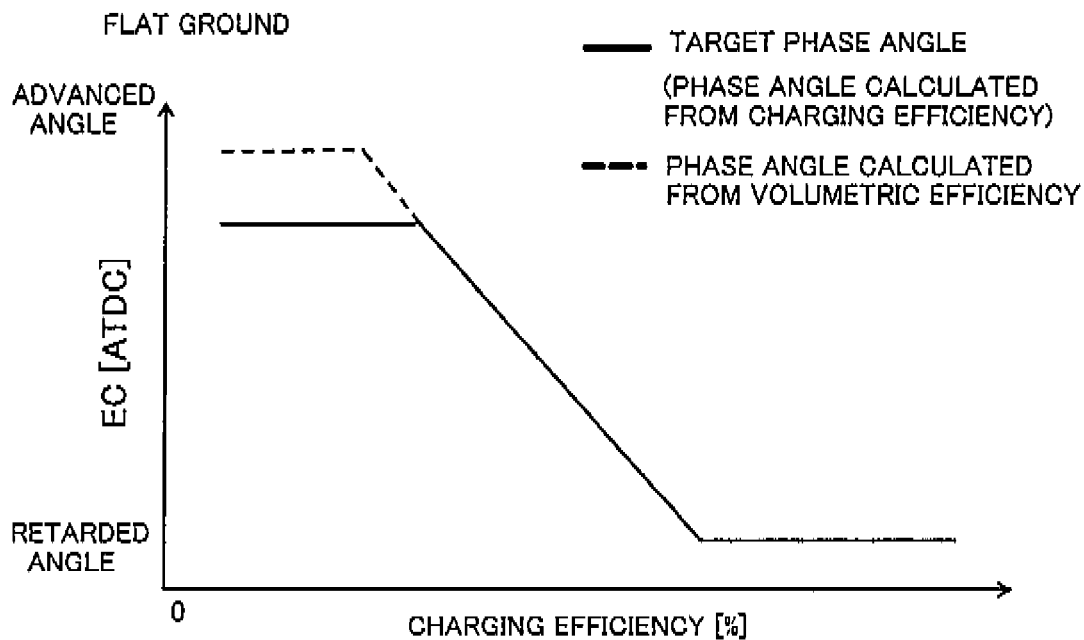
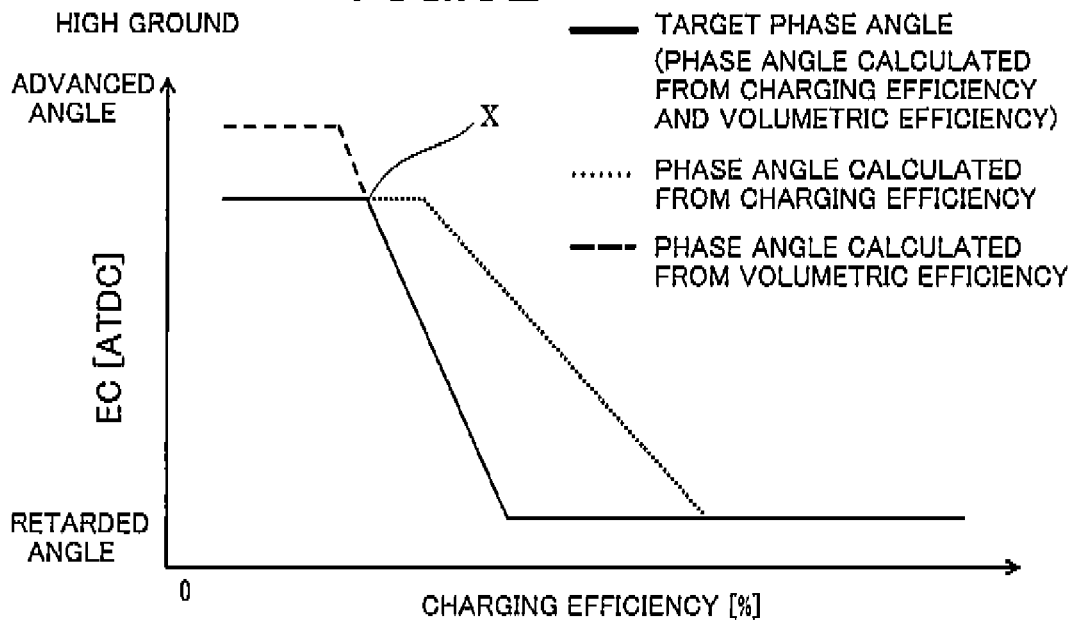

CONTROL DEVICE FOR INTERNAL COMBUSTION ENGINE

The entire disclosure of Japanese Patent Application No. 2018-058924 filed on Mar. 26, 2018 is expressly incorporated by reference herein.

TECHNICAL FIELD

This invention relates to a control device for an internal combustion engine, which controls a variable valve timing mechanism so that an optimum valve overlap amount is obtained in accordance with an operating state, thereby reducing a possibility for heat damage to a catalyst while ensuring a sufficient output of the engine.

BACKGROUND ART

In recent years, some engines loaded on automobiles, etc. have been equipped with a variable valve timing mechanism (VVT mechanism) which can continuously change a timing when an intake valve is opened (intake valve opening timing) and a timing when an exhaust valve is closed (exhaust valve closing timing). By controlling the VVT mechanism, it becomes possible to change a valve overlap amount (a section ranging from the intake valve opening timing to the exhaust valve closing timing) continuously. Generally, in a low to medium load region, the valve overlap amount is increased and an internal EGR amount is increased, whereby an improvement in emission gas purification performance and an increase in fuel economy due to a decrease in pumping loss are achieved. In a high load region, on the other hand, the intake valve opening timing and the exhaust valve closing timing are controlled by the VVT mechanism from the viewpoint of increasing the output, and the valve overlap amount is changed from a relatively small state to a large state, and again to a small state, in accordance with an increase in the engine speed. As shown here, the timing when the intake valve is opened (intake valve opening timing) and the timing when the exhaust valve is closed (exhaust valve closing timing) are controlled, as appropriate, in accordance with the operating state (see, for example, Japanese Patent No. 2749226).

SUMMARY OF THE INVENTION

Problems to be Solved by the Invention

The above-described valve overlap amount is usually set in conformity with the operating state on a flat ground (standard state), and thus can naturally be set without any problems in a flat-ground operating state. However, on a high ground at low atmospheric pressure, for example, the problems arise that the air density declines and, in a high load region, in particular, the necessary air intake amount is not obtained, and the desired output fails to be obtained.

The present invention has been accomplished in the light of the above-mentioned circumstances. It is an object of this invention to provide a control device for an internal combustion engine which can set the VVT phase angle so that a reduction in the output can be suppressed even on a high ground, while ensuring the sufficient output of the engine.

Means for Solving the Problems

An aspect of the present invention for solving the above problems is a control device for an internal combustion engine having a variable valve timing mechanism which changes at least one of an opening and a closing timing of at least one of an intake valve and an exhaust valve, comprising: a processor device; a memory device for storing a control program for controlling the processor device; a first sensor for detecting atmospheric pressure; and a second sensor for detecting the amount of air flowing through an intake air flow path, wherein the control program causes the processing device to, calculate a charging efficiency based on the amount of air detected by the second sensor, calculate a volumetric efficiency from the amount of air and the atmospheric pressure detected by the first sensor, calculate the charging efficiency valve opening timing of the intake valve based on the charging efficiency, calculate the volumetric efficiency valve opening timing of the intake valve based on the volumetric efficiency, and set the valve opening timing(s) of the at least one of the intake valve and the exhaust valve by the variable valve timing mechanism based on one of the charging efficiency valve opening timing and the volumetric efficiency valve opening timing.

According to such an aspect, control is exercised such that the valve opening timing of the intake valve is calculated based on the charging efficiency, the valve opening timing of the intake valve is calculated based on the volumetric efficiency, and the valve opening timing(s) of the at least one of the intake valve and the exhaust valve is set based on one of the valve opening timing calculated based on the charging efficiency and the valve opening timing calculated based on the volumetric efficiency. By this control procedure, the VVT phase angle can be set so that the maximum output on the high ground can be achieved.

Here, the control program is preferably a program that causes the processor device to set the charging efficiency valve opening timing or the volumetric efficiency valve opening timing, whichever is set to a more advanced angle side, as the valve opening timing of the intake valve.

According to the above feature, if there is a deviation between the charging efficiency valve opening timing and the volumetric efficiency valve opening timing, namely, if the target phase angle differs between the charging efficiency valve opening timing and the volumetric efficiency valve opening timing owing to the influence of atmospheric pressure ascribed to the height above the sea level, the target phase angle on the more advanced angle side is used, whereby the intake air amount can be prevented from decreasing, and the output can be prevented from lowering.

Preferably, the internal combustion engine is equipped with a supercharging device and, in connection with the volumetric efficiency valve opening timing, the latest timing of the valve opening timings, at which supercharging by the supercharging device can be achieved, is calculated as the valve opening timing of the intake valve, if a target torque calculated by a target torque calculation unit is within a range where the supercharging by the supercharging device is performed.

According to this feature, the valve opening timing based on the volumetric efficiency is set as the latest timing of the valve opening timings at which supercharging can be performed. By so doing, even if a region where supercharging is possible changes under the influence of atmospheric pressure (height above the sea level), output can be achieved, and the volumetric efficiency valve opening timing with satisfactory fuel economy can be used.

As for the volumetric efficiency valve opening timing, it is preferred that the valve opening timing of the intake valve be set to the latest timing, if the target torque calculated by the target torque calculation unit lies in a range where supercharging by the supercharging device is not performed.

According to the above feature, in a non-supercharging region where the influence of atmospheric pressure (height above sea level) is minimal, the volumetric efficiency valve opening timing is set to the most retarded angle. By so doing, the charging efficiency valve opening timing can be reliably selected to prevent deterioration of combustion due to a valve overlap.

Effects of the Invention

With the control device for an internal combustion engine according to the present invention, as described above, control is exercised such that the valve opening timing of the intake valve is calculated based on the charging efficiency, the valve opening timing of the intake valve is calculated based on the volumetric efficiency, and the valve opening timing(s) of one or both of the intake valve and the exhaust valve is set based on one of the valve opening timing calculated based on the charging efficiency and the valve opening timing calculated based on the volumetric efficiency. By this control, the effect is exhibited that the VVT phase angle can be set so that the lowering of output can be suppressed even on the high ground.

BRIEF DESCRIPTION OF THE DRAWINGS

FIGS. 2A and 2B are views showing the relationship between a charging efficiency and a target intake valve opening timing on each of a flat ground and a high ground according to Embodiment 1.

FIGS. 3A and 3B are views showing the relationship between a charging efficiency and an exhaust valve closing timing on each of the flat ground and the high ground according to Embodiment 1.

MODE FOR CARRYING OUT THE INVENTION

The present invention will now be described based on its embodiments.

Embodiment 1

Figure 1:
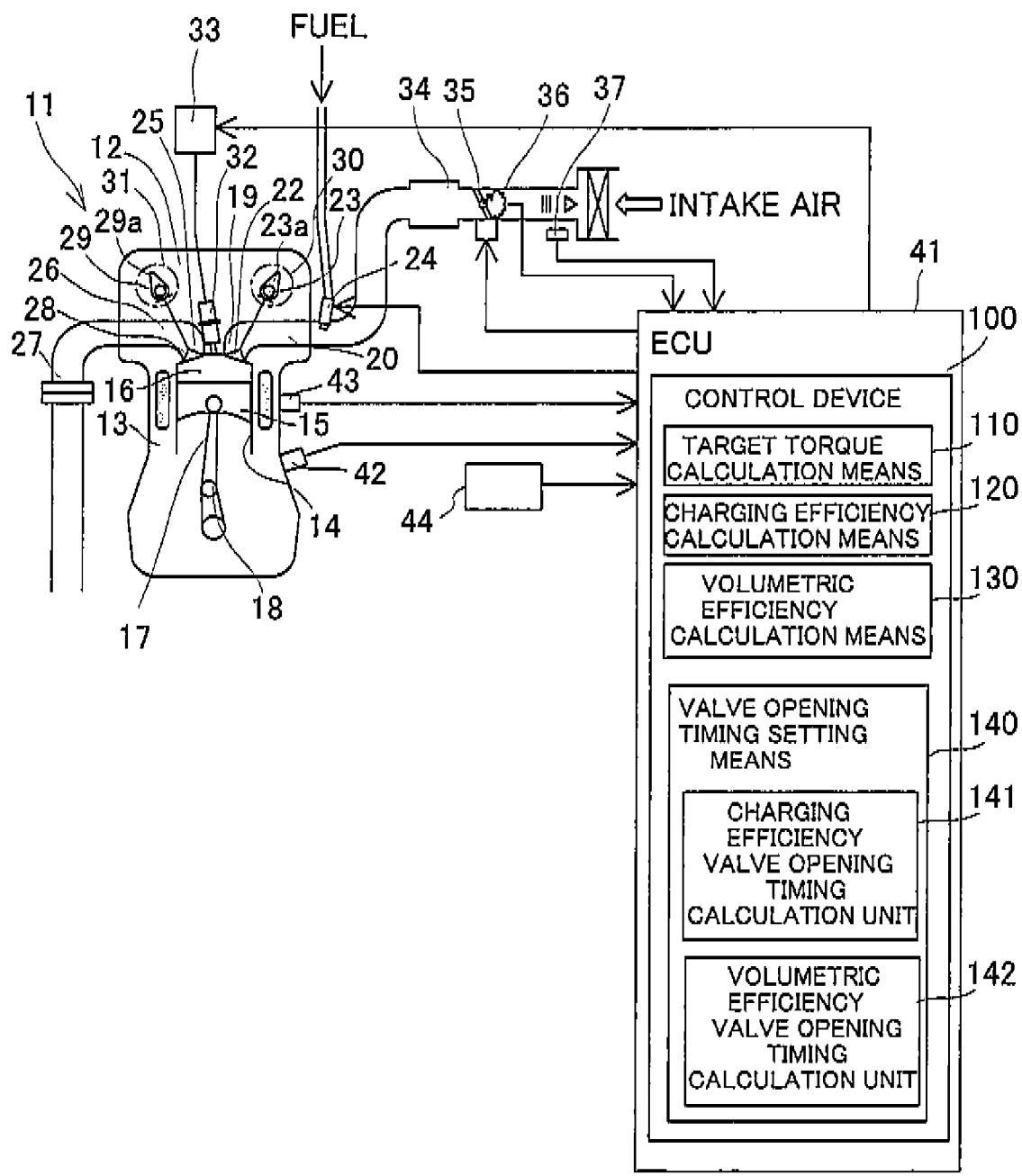
FIG. 1 is a schematic configurational view of an engine system including a control device according to Embodiment 1.

FIG. 1 is a view showing the schematic configuration of an engine system including a control device according to Embodiment 1. In the present embodiment, an explanation will be offered for an example in which this control device is applied to a manifold fuel injection gasoline engine.

An engine 11 as shown in FIG. 1 is a manifold fuel injection (multipoint injection) engine having a cylinder head 12 and a cylinder block 13. Within each cylinder 14 of the cylinder block 13, a piston 15 is housed so as to be capable of reciprocating. The piston 15, the cylinder 14, and the cylinder head 12 form a combustion chamber 16. The piston 15 is connected to a crankshaft 18 via a connecting rod 17. Reciprocating motions of the piston 15 are transmitted to the crankshaft 18 via the connecting rod 17.

An intake port 19 is formed in the cylinder head 12. An intake manifold 20 is connected to the intake port 19. An intake valve 22 is provided in the intake port 19, and the intake valve 22 is configured to act following an intake cam 23a of a camshaft 23 rotating in accordance with an engine rotation, thereby making the combustion chamber 16 and the intake port 19 communicate with or blocked from each other. The intake manifold 20 is provided with, for example, an electromagnetic fuel injection valve 24, and a fuel supply device equipped with a fuel tank is connected to the fuel injection valve 24 via a fuel valve, although this is not shown.

In the cylinder head 12, an exhaust port 25 is further formed. An end of an exhaust manifold 26 is connected to the exhaust port 25, and an exhaust pipe (exhaust passage) 27 is connected to the other end of the exhaust manifold 26. An exhaust valve 28 is provided in the exhaust port 25. Like the intake valve 22 in the intake port 19, the exhaust valve 28 is configured to act following an exhaust cam 29a of a camshaft 29, thereby making the combustion chamber 16 and the exhaust port 25 communicate with or blocked from each other.

The cylinder head 12 is provided with variable valve timing mechanisms (VVT mechanisms) 30, 31 which advance or retard the rotation phases of the cams 23a, 29a to render the opening/closing timings of the intake valve 22 and the exhaust valve 28 variable. The phases of the cams 23a, 29a, which drive the intake valve and the exhaust valve, with respect to the crankshaft are changed by the variable valve timing mechanisms 30, 31. By this means, the intake valve opening timing which is the timing for opening the intake valve 22 and the exhaust valve closing timing which is the timing for closing the exhaust valve 28 can be changed.

As the variable valve timing mechanisms 30, 31, various publicly known ones can be applied. For example, hydraulic ones capable of continuously changing the phases of the cams 23a, 29a are preferably used. In the present embodiment, the variable valve timing mechanisms 30, 31 are provided for the intake cam 23a and the exhaust cam 29a, respectively. However, the variable valve timing mechanisms 30, 31 may be provided for one of the intake cam 23a and the exhaust cam 29a.

The cylinder head 12 has an ignition plug 32 mounted thereon for each cylinder. An ignition coil 33 for outputting a high voltage is connected to each ignition plug 32. A surge tank 34 is provided on the upstream side of the intake manifold 20. A throttle valve 35 for adjusting the amount of intake air is provided on the upstream side of the surge tank 34, and a throttle position sensor (TPS) 36 for detecting the opening of the throttle valve 35 is also provided there. The opening of the throttle valve 35 is adjusted interlockingly with the operation of an accelerator pedal, although this is not shown. An air flow sensor 37 for measuring the amount of intake air flowing through an intake air flow path is interposed upstream of the throttle valve 35.

ECU (electronic control unit) 41 includes input-output devices, storage devices (ROM, RAM, etc.), a central processing unit (CPU), and timers/counters. The ECU 41 exercises the integrated control of the engine 11. To the input side of the ECU 41 are connected the aforementioned throttle position sensor 36 and air flow sensor 37, and various other sensors such as a crank angle sensor 42 for detecting the crank angle of the engine 11, a water temperature sensor 43 for detecting the water temperature of the engine 11, and an atmospheric pressure sensor 44 for detecting the atmospheric pressure. Information detected by these sensors is inputted to the ECU 41. The atmospheric pressure sensor 44 can be used as a first sensor, and the air flow sensor 37 can be used, for example, as a second sensor.

To the output side of the ECU 41, various output devices are connected, such as the aforementioned fuel injection valve 24, ignition coil 33, VVT mechanisms 30, 31, and throttle valve 35. To these various output devices, predetermined information is outputted from the ECU 41 based on the detection information from the various sensors.

The control device 100 of the present embodiment is constituted by such various sensors, the ECU 41 as a processor device, ROM storing a control program or the like, and RAM as a work area for the control program, and is equipped with a target torque calculation means 110, a charging efficiency calculation means 120, a volumetric efficiency calculation means 130, and a valve opening timing setting means 140 which function under the control program. A detailed explanation for these devices and means will be offered below.

The control device 100 has the target torque calculation means 110, which calculates a target torque, based on the information such as the operating state of the engine 11 detected by the various sensors including the air flow sensor 37 functioning as the second sensor. The target torque calculation means 110 calculates the target torque in accordance with the operating status based on the engine speed Ne of the engine 11 detected by the crank angle sensor 42, which is an operating state detection means, and the opening of the accelerator.

The control device 100 also includes the charging efficiency calculation means 120 for calculating the target charging efficiency based on the target torque calculated by the target torque calculation means 110, and the volumetric efficiency calculation means 130 for calculating the target volumetric efficiency based on the target torque from the target torque calculated by the target torque calculation means 110 and the atmospheric pressure detected by the atmospheric pressure sensor 44 functioning as the first sensor. The charging efficiency calculation means 120 calculates the target charging efficiency based on the target torque, but may calculate the target charging efficiency, for example, from the engine speed Ne of the engine 11 detected by the crank angle sensor 42 and the pressure of the intake manifold 20.

The volumetric efficiency is an efficiency which represents the suction capacity of a 4-stroke engine. The charging efficiency is an index which represents the absolute amount of fresh air contributing to combustion, and is expressed as the mass of intake dry fresh air relative to the mass of dry fresh air occupying the stroke volume under the standard atmospheric conditions. On the other hand, the volumetric efficiency is expressed as the volume of intake dry fresh air relative to the stroke volume, and is an index not dependent on the atmospheric pressure or the atmospheric temperature.

Furthermore, the control device 100 includes the valve opening timing setting means 140 which sets the valve opening timings of the intake valve 22 and the exhaust valve 28 with the use of the variable valve timing mechanisms 30, 31.

The valve opening timing setting means 140 is equipped with a charging efficiency valve opening timing calculation unit 141 which calculates the valve opening timing of the intake valve 22 based on the target charging efficiency (hereinafter, such valve opening timing will be referred to as an Ec target phase angle), namely, based on a map or the like showing the relationship between the target charging efficiency and the valve opening timing of the intake valve 22 settable relative to a predetermined charging efficiency; and a volumetric efficiency valve opening timing calculation unit 142 which calculates the valve opening timing of the intake valve 22 based on the target volumetric efficiency (hereinafter, such valve opening timing will be referred to as an Ev target phase angle), namely, based on a map or the like showing the relationship between the target volumetric efficiency and the valve opening timing of the intake valve 22 settable relative to a predetermined volumetric efficiency.

In the present embodiment, the valve opening timing setting means 140 uses either the Ec target phase angle calculated by the charging efficiency valve opening timing calculation unit 141, or the Ev target phase angle calculated by the volumetric efficiency valve opening timing calculation unit 142, in setting the valve opening timing of the intake valve 22. In the present embodiment, as described above, the Ec target phase angle and the Ev target phase angle are calculated only in connection with the intake valve 22. In connection with the exhaust valve 28 as well, however, the Ec target phase angle and the Ev target phase angle may be calculated, and one of them may be used as a basis for the valve opening timing of the exhaust valve 28.

In setting the valve opening timing of the intake valve 22, which of the Ec target phase angle calculated by the charging efficiency valve opening timing calculation unit 141, and the Ev target phase angle calculated by the volumetric efficiency valve opening timing calculation unit 142 the valve opening timing setting means 140 should select may be selected based on predetermined conditions. For example, in the range of the charging efficiency or the volumetric efficiency where all of the valve opening timings can be selected, it is possible to select the Ec target phase angle, whereas in the range of the charging efficiency or the volumetric efficiency where some of the valve opening timings cannot be selected, it is possible to select the Ev target phase angle, although details about this will be mentioned later. Alternatively, if the atmospheric pressure by the atmospheric pressure sensor 44 is lower than a predetermined pressure, namely, on a high ground at a height equal to or higher than a predetermined height above sea level, the Ev target phase angle can be selected and, in other cases, the Ec target phase angle can be selected. Further alternatively, it is permissible, for example, to compare the Ec target phase angle and the Ev target phase angle constantly, and select a valve opening timing on an advanced angle side.

In any case, if no problem arises during travel on the flat ground, for example, the Ec target phase angle may be selected. If a necessary amount of intake air fails to be obtained during a travel on the high ground, for example, the Ev target phase angle may be selected. In the present embodiment, the valve opening timing setting means 140 is configured to make a constant comparison between the Ec target phase angle and the Ev target phase angle, and select the valve opening timing on the advanced angle side.

With the control device 100 configured as above, the target torque calculation means 110 calculates the target torque based on the information such as the operating state of the engine 11. Based on this target torque, the charging efficiency calculation means 120 calculates the target charging efficiency. The volumetric efficiency calculation means 130 calculates the target volumetric efficiency from the target torque calculated by the target torque calculation means 110 and the atmospheric pressure detected by the atmospheric pressure sensor 44.

Then, the charging efficiency valve opening timing calculation unit 141 calculates the Ec target phase angle from the target charging efficiency with the use of the aforementioned map or the like, while the volumetric efficiency valve opening timing calculation unit 142 calculates the Ev target phase angle from the target volumetric efficiency with the use of the aforementioned map or the like. The valve opening timing setting means 140 uses either the Ec target phase angle or the Ev target phase angle. In the present embodiment, as described above, the Ec target phase angle and the Ev target phase angle are calculated only in connection with the intake valve 22. However, in connection with the exhaust valve 28 as well, the Ec target phase angle and the Ev target phase angle may be calculated, and one of them may be adopted as the valve opening timing of the exhaust valve 28.

As for the target intake valve opening timing (target IO) and the target exhaust valve closing timing (target EC), one of the Ec target phase angle and the Ev target phase angle is selected so that the valve opening timing of the intake valve 22 is set and the valve closing timing of the exhaust valve 28 is set. The valve opening timing setting means 140, as described above, sets the target values of the intake valve opening timing and the exhaust valve closing timing as appropriate, and exercises feedback control of the VVT mechanisms 30, 31 so that the actual intake valve opening timing and the actual exhaust valve closing timing will become the target values.

FIGS. 2A and 2B show an example of the relationship between the charging efficiency and the intake valve opening timing on each of the flat ground and the high ground. The phase is advanced on the minus side, and retarded on the plus side, and the region C is a region where the target intake air amount cannot be realized if the valve opening timing is set within this region. FIG. 2A is a graph for the flat ground, whereas FIG. 2B is a graph for the high ground, and the region C increases in range on the high ground.

The graph indicated by a solid line shows the Ec target phase angle with the charging efficiency used as a factor, and the graph indicated by a dashed line shows the Ev target phase angle with the volumetric efficiency used as a factor. On the flat ground, both the Ec target phase angle and the Ev target phase angle are nearly in agreement. On the high ground, the Ec target phase angle with the charging efficiency used as the factor enters the region C beyond the point X, whereas the Ev target phase angle with the volumetric efficiency used as the factor is outside the region C.

In the present embodiment, therefore, the Ec target phase angle involving the charging efficiency as the factor is selected for the flat ground and up to the point X on the high ground. However, if the Ev target phase angle is located on the advanced angle side relative to the Ec target phase angle beyond the point X, the Ev target phase angle is selected.

FIGS. 3A and 3B are graphs each showing an example of the relationship between the charging efficiency and the phase of the exhaust valve opening timing, FIG. 3A being for the flat ground, and FIG. 3B being for the high ground. As shown in FIG. 3A, for the flat ground, the Ec target phase angle involving the charging efficiency as the factor is selected eventually in the entire region. For the high ground, the Ec target phase angle involving the charging efficiency as the factor is selected until the point X is exceeded. In the region beyond the point X, however, the Ev target phase angle using the volumetric efficiency as the factor, which is situated on the advanced angle side, is adopted, because the Ec target phase angle involving the charging efficiency as the factor and the Ev target phase angle using the volumetric efficiency as the factor are different from each other.

Figure 4:
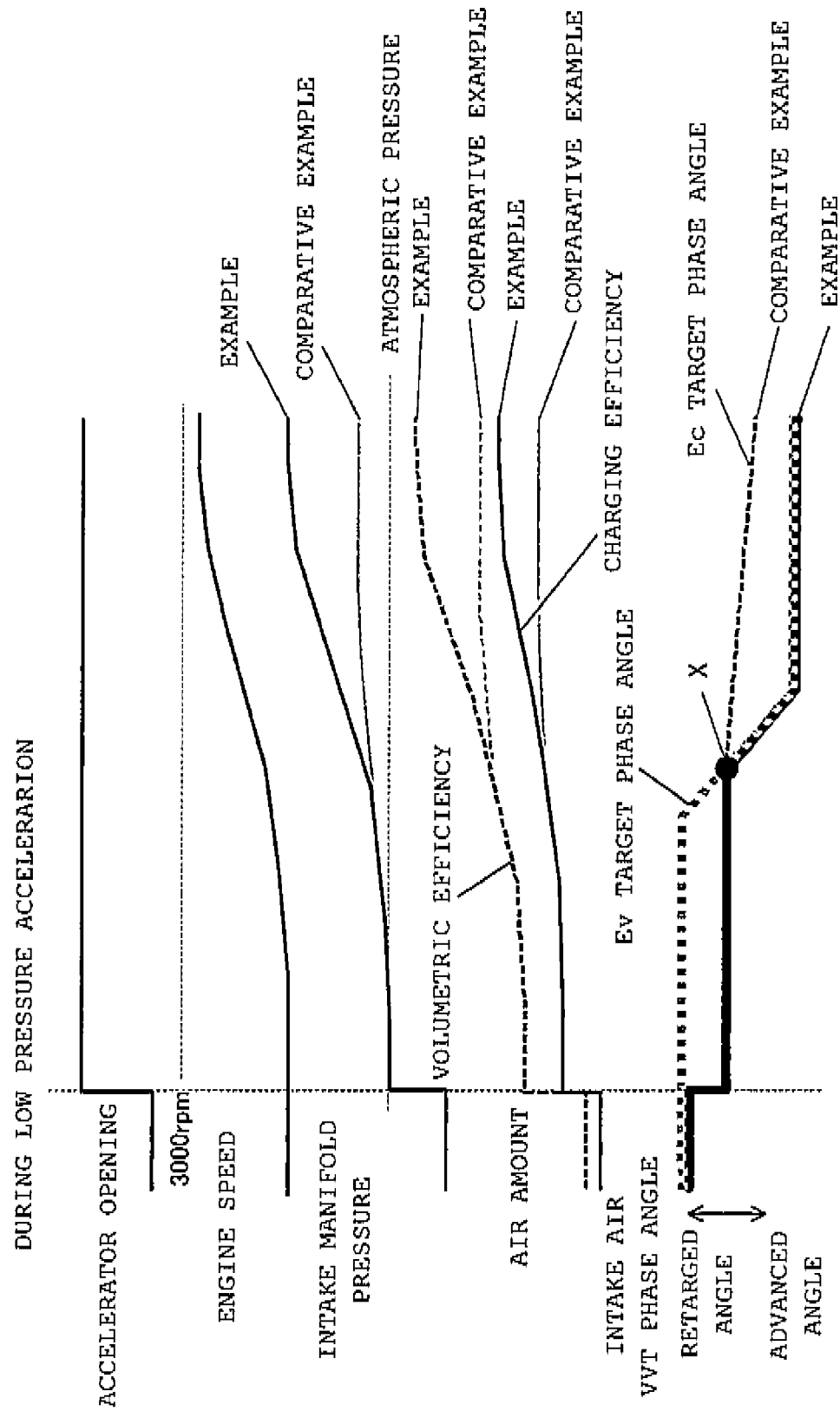
FIG. 4 is a view showing an example of a timing chart according to Embodiment 1

FIG. 4 is a view illustrating an example of a timing chart according to the embodiment, showing the relationship among the opening of the accelerator, the rotational speed of the engine, the pressure of the intake manifold, the amount of air, and the intake VVT phase angle during a travel on the high ground. The intake VVT phase angle is represented as the Ec target phase angle with the charging efficiency used as the factor, and the Ev target phase angle with the volumetric efficiency used as the factor. The amount of air is expressed as the charging efficiency and the volumetric efficiency. The timing chart also shows these parameters as Examples where the aforementioned control of the embodiment was exercised, and Comparative Examples where such control was not performed.

Illustrated is a state where the accelerator is open to perform low pressure acceleration. In this state, the engine speed rises, and the pressure of the intake manifold also increases. On the flat ground where the atmospheric pressure is relatively high as shown in FIG. 2A, for example, the charging efficiency Ec also increases to a value close to its maximum value during a high load travel (a case where the opening of the TPS is nearly full). In this case, the Ec target phase angle is present on the retarded angle side relative to the Ev target phase angle, so that the Ec target phase angle is selected.

When the point X is exceeded, the Ec target phase angle is present on the advanced angle side relative to the Ev target phase angle. Thus, based on the control of the embodiment described above, the Ev target phase angle using the volumetric efficiency as the factor is adopted. Consequently, as compared with the Comparative Example adopting the Ec target phase angle as is, the Example adopting the Ev target phase angle provides a sufficient amount of air, and has the volumetric efficiency and the charging efficiency greater than those in the Comparative Example.

The control device for the internal combustion engine according to the present embodiment, as described above, exercises control such that the valve opening timing of one or both of the intake valve and the exhaust valve is set based on one of the charging efficiency valve opening timing and the volumetric efficiency valve opening timing. Concretely, the charging efficiency valve opening timing or the volumetric efficiency valve opening timing, whichever is set to a more advanced angle side, is set as the valve opening timing of the intake valve. Thus, if there is a deviation between the charging efficiency valve opening timing and the volumetric efficiency valve opening timing, namely, if the target phase angle differs between the charging efficiency valve opening timing and the volumetric efficiency valve opening timing owing to the influence of atmospheric pressure ascribed to the height above sea level, the target phase angle on the more advanced angle side is used, with the result that the effect of preventing the intake air amount from decreasing and the output from lowering is obtained. Hence, the effect that the VVT phase angle can be set so as to suppress a fall in the output even on the high ground is exhibited.

Embodiment 2

The embodiment of the present invention has been described above, but it goes without saying that this invention is in no way limited to the foregoing embodiment.

The engine to which the control device of the present embodiment is applied is equipped with a turbocharger being a supercharging means which rotates a turbine disposed in an exhaust system by exhaust to rotate a compressor disposed in an intake system, thereby supercharging intake air.

In case such a turbocharger is provided, it is preferred for the volumetric efficiency valve opening timing calculation unit 142 to calculate the latest timing of the valve opening timings, at which supercharging by the turbocharger is achievable, as the valve opening timing of the intake valve 22, if the target torque calculated by the target torque calculation means 110 is in a range where supercharging by the turbocharger is performed.

As shown above, if the valve opening timing by the volumetric efficiency valve opening timing calculation unit 142 is set as the latest timing of the valve opening timings capable of supercharging, the volumetric efficiency valve opening timing can be used as a valve opening timing capable of stable combustion, even if the superchargeable region changes under the influence of atmospheric pressure (height above sea level).

If the range where supercharging by the turbocharger takes place is shown in FIGS. 2A and 2B, it ranges from the charging efficiency a little before commencement of existence of the region C to the charging efficiency during the existence of the region C.

It is also preferred for the volumetric efficiency valve opening timing calculation unit 142 to set the valve opening timing of the intake valve 22 to the latest timing, even if the target torque calculated by the target torque calculation means 110 is in a range where supercharging by the turbocharger is not performed.

As noted above, in a non-supercharging region which is minimally influenced by atmospheric pressure (height above sea level), the volumetric efficiency valve opening timing is set at the most retarded angle. By so doing, the charging efficiency valve opening timing is reliably selected, and frequent switching between the charging efficiency valve opening timing and the volumetric efficiency valve opening timing can be prevented. That is, according to the present embodiment, in the non-supercharging region minimally influenced by atmospheric pressure (height above sea level), the volumetric efficiency valve opening timing is set at the most retarded angle. Consequently, the effects are exhibited that the charging efficiency valve opening timing is reliably selected, and deterioration of combustion due to the valve overlap can be prevented.

Other Embodiments

In the above-described embodiments, the present invention has been described, with the manifold fuel injection engine being taken as the example. Needless to say, however, the present invention can be employed in other types of engines such as the direct injection type.

EXPLANATIONS OF LETTERS OR NUMERALS

100 Control device
11 Engine
12 Cylinder head
13 Cylinder block
14 Cylinder
15 Piston
16 Combustion chamber
17 Connecting rod
18 Crankshaft
19 Intake port
20 Intake manifold
22 Intake valve
23 Camshaft
23a Cam
24 Fuel injection valve
25 Exhaust port
26 Exhaust manifold
27 Exhaust pipe
28 Exhaust valve
29 Camshaft
29a Cam
30, 31 Variable valve timing mechanism (VVT mechanism)
32 Ignition plug
33 Ignition coil
34 Surge tank
35 Throttle valve
36 Throttle position sensor (TPS)
37 Air flow sensor
40 Temperature sensor
41 ECU
42 Crank angle sensor
44 Atmospheric pressure sensor

The invention claimed is:

1. A control device for an internal combustion engine having a variable valve timing mechanism which changes an opening or closing timing of one or both of an intake valve and an exhaust valve, comprising:
   a processor device;
   a memory device storing a program controlling the processor device;
   a first sensor detecting atmospheric pressure; and
   a second sensor detecting an amount of air flowing through an intake air flow path,
   wherein the program causes the processor device to,
   calculate a charging efficiency based on the amount of air detected by the second sensor,
   calculate a volumetric efficiency from the amount of air and the atmospheric pressure detected by the first sensor,
   calculate a charging efficiency valve opening timing of the intake valve based on the charging efficiency,
   calculate a volumetric efficiency valve opening timing of the intake valve based on the volumetric efficiency, and
   set the valve opening timing or valve opening timings of at least one of the intake valve and the exhaust valve by the variable valve timing mechanism based on one of the charging efficiency valve opening timing and the volumetric efficiency valve opening timing,
   wherein program causes the processor device to compare the calculated charging efficiency valve opening timing and the calculated volumetric efficiency valve opening timing, and set, whichever is calculated to be a more advanced angle side, as the valve opening timing of the intake valve.

2. The control device for an internal combustion engine according to claim 1, wherein
   the internal combustion engine is equipped with a supercharging device, and
   in connection with the volumetric efficiency valve opening timing, the latest timing of the valve opening timings, at which supercharging by the supercharging device can be achieved, is calculated as the valve opening timing of the intake valve, if a target torque calculated by a target torque calculation unit is within a range where the supercharging by the supercharging device is performed.

3. The control device for an internal combustion engine according to claim 2, wherein
   in connection with the volumetric efficiency valve opening timing, the valve opening timing of the intake valve is set to the latest timing, if the target torque calculated by the target torque calculation unit lies in a range where the supercharging by the supercharging device is not performed.

\* \* \* \* \*